United States Patent [19]
Orr

[11] 3,972,106
[45] Aug. 3, 1976

[54] PINNED-ON PLANETARY RING GEAR ASSEMBLY AND SALVAGE METHOD

[75] Inventor: Robert S. Orr, Pekin, Ill.

[73] Assignee: Caterpillar Tractor Co., Peoria, Ill.

[22] Filed: Jan. 10, 1975

[21] Appl. No.: 540,256

Related U.S. Application Data

[62] Division of Ser. No. 385,901, Aug. 6, 1973, abandoned.

[52] U.S. Cl. ............................ 29/401 R; 29/159.2; 74/750 R; 74/801
[51] Int. Cl.² ....................................... B23P 7/00
[58] Field of Search ........... 29/401 R, 401 F, 159.2; 74/801, 750, 447

[56] References Cited
UNITED STATES PATENTS

| | | | |
|---|---|---|---|
| 2,770,149 | 11/1956 | Losey | 74/675 X |
| 3,273,232 | 9/1966 | Royer | 29/401 X |
| 3,352,177 | 11/1967 | Cleff et al. | 74/801 |

*Primary Examiner*—Victor A. Di Palma
*Attorney, Agent, or Firm*—Phillips, Moore, Weissenberger Lempio & Strabala

[57] ABSTRACT

A ring gear mounted within a final drive or transmission housing and fixed against rotation with respect thereto. The ring gear is provided with a plurality of angularly spaced peripheral semi-circular recesses contiguous with opposing recesses in a peripheral portion of the housing. Drive pins are inserted within the circular apertures formed by the opposed semi-circular recesses. The pins and the ring gear are retained against axial movement by means of keeper plates fastened to a peripheral portion of the housing. A method of salvaging a ring gear-housing assembly having a worn housing spline. The method includes providing the formerly described semi-circular recesses in peripheral portions of the ring gear and housing, providing drive pins for the aperture thereby, and providing keeper plates for retaining the ring gear and drive pins against axial movement. A method of salvaging a ring gear-housing assembly having worn semi-circular ring gear retaining recesses in the periphery of the housing. The method includes removing axial retention keeper plates from the housing, removing the drive pins from the apertures formed by the opposing semi-circular recesses in the ring gear and housing, angularly displacing the ring gear with respect to the housing, providing additional semi-circular recesses in the periphery of the housing at points thereof contiguous with the semi-circular recesses provided in the displaced ring gear, installing drive pins in the apertures formed by the semi-circular recesses in the ring gear and newly provided recesses in housing, and installing keeper plates to retain the pins and ring gear against axial movement.

5 Claims, 5 Drawing Figures

Fig-4-
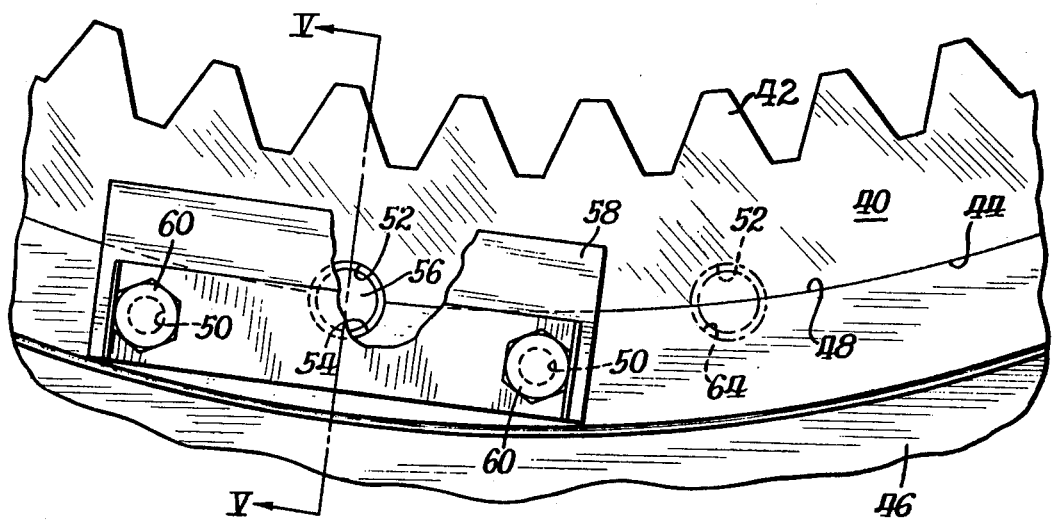
Fig-5-
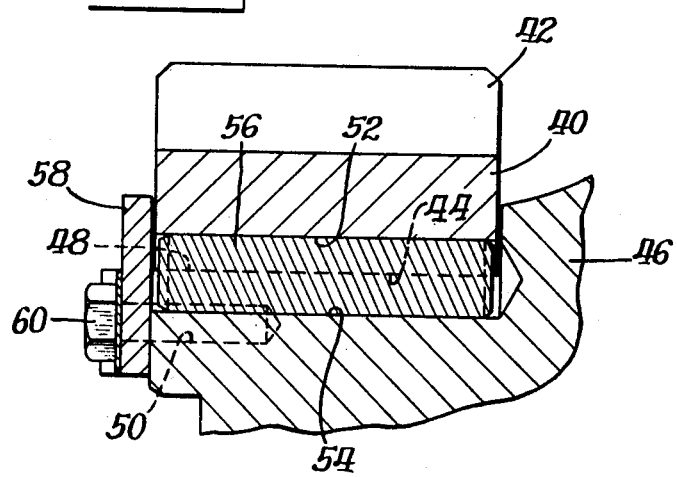

PINNED-ON PLANETARY RING GEAR ASSEMBLY AND SALVAGE METHOD

This is a division of Ser. No. 385,901 now abandoned, filed Aug. 6, 1973.

BACKGROUND OF THE INVENTION

Large ring gears such as those used in final drives or in transmissions are usually supplied with peripheral external splines which are intended to engage similar splines provided on an internal peripheral surface of the housing within which the ring gear is mounted. Conventionally, retaining rings or tab means are provided on the housing to prevent axial movement of the ring gear. The torque reaction produced by planetating pinions orbiting within the ring gear is carried by the splines provided in the housing.

Ring gears are usually formed from high-strength alloy steel which has been hardened for wear resistance and strength. On the contrary, the housing or gear case is normally manufactured from a softer material such as cast steel. Consequently, the torque load application to the housing splines results in time in wear or deformation of the splines in the housing but not on the splines provided on the ring gear. Such wear or deformation can result in backlash, not only in the immediate connection but in the gear train transmitting power to the ring gear and in some cases in a complete failure of the housing splines.

Inasmuch as final drives and transmission housings are extremely expensive, especially in large earth moving machinery and the like, methods of repair and salvage have been devised for rejuvenating a worn ring gear-housing assembly. One method which has been used involves the building up of worn housing spline teeth by means of welding followed by remachining of such spline teeth on the ring gear and the housing to provide proper mating. This procedure involves considerable time and expense and requires large and specialized machine tools.

It is an object of this invention to provide a new ring gear-housing combination wherein the ring gear is retained within the housing by inexpensive, easily replaceable means.

It is a further object of this invention to provide means for salvaging a conventional splined interface ring gear-housing assembly or combination.

Still another object of this invention is to provide a method whereby the novel ring gear-housing assembly presented herein may be salvaged for further use after sufficient wear has occured to render it inoperative.

Other objects and advantages of the invention will become apparent from the following description and claims.

SUMMARY OF THE INVENTION

The instant invention provides a readily machinable, easily serviceable ring gear-housing assembly for a final drive, transmission, or the like. The ring gear is provided with a plurality of externally peripherally disposed semi-circular recesses which are adapted to co-act with a like plurality of opposed semi-circular recesses on an internal peripheral portion of a housing to form circular apertures for receiving drive pins therein. Keeper plates are provided on the housing to constrain the drive pins and ring gear against axial movement. When sufficient wear of the semi-circular recesses formed within the housing occurs, the ring gear-housing assembly may be rejuvenated by providing new semi-circular recesses in the housing at positions angularly spaced from the originally provided recesses. The ring gear is rotated within the housing so that the recesses therein coincide with the housing recesses to form new drive pin receiving apertures for fixing the combination elements against relative rotation.

BRIEF DESCRIPTION OF THE DRAWINGS

FIG. 4 is an enlarged elevation similar to FIG. 2 but showing an alternate context for the present invention; and FIG. 5 is a sectional view taken along the line V—V in FIG. 4.

DETAILED DESCRIPTION

Figure 1:
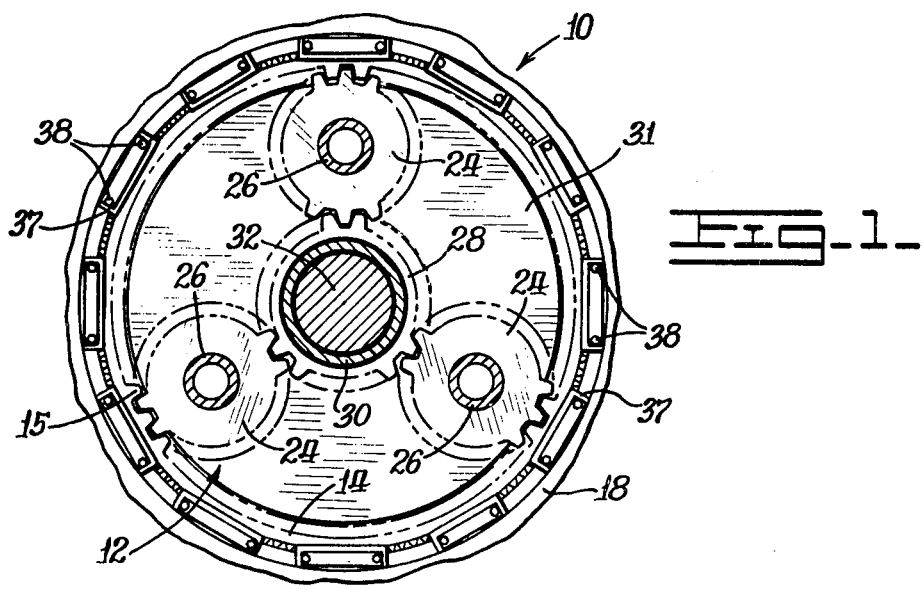
FIG. 1 is a partial elevation view of a ring gear equipped final drive housing embodying some of the principles of the invention.
Figure 2:
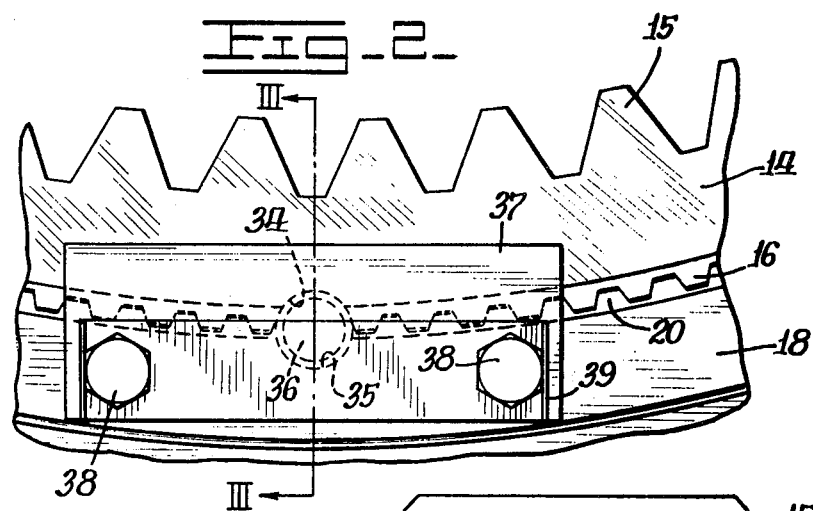
FIG. 2 is an enlarged partial view of a portion of the ring gear-housing shown in FIG. 1.

With reference to FIG. 1 in the drawings, a ring gear-housing assembly or combination is shown generally at 10. Internally of the ring gear, is disposed a planetary drive mechanism 12. The ring gear element of the combination is shown at 14. It consists of an annular ring having gear teeth 15 formed on an internal peripheral portion thereof. With reference to FIG. 2, it will be seen that the ring gear is also provided with a plurality of spline teeth 16 formed on the external peripheral surface thereof. The housing element of the combination, for instance a final drive housing, is shown at 18. The housing portion includes an internally splined portion having spline teeth 20 adapted for torque load supporting engagement with the splines 16 of the ring gear.

The planetary drive mechanism 12 includes a plurality of pinion gears 24 which are carried upon equally angularly spaced shaft means 26 and which are adapted for engagement with the teeth 15 of the ring gear. The shafts 26 are fixed for rotation with a common carrier 31. A sun gear 28 is rotatably supported upon a tubular input drive shaft 30 in which is concentrically journalled an axle 32. The teeth of the sun gear 28 mesh with the teeth of each of the planetating gears 24.

Upon rotation of the sun gear 28, the planetary gears 24 orbit around the interior of the ring gear in meshing relation to the teeth 15 to drive the planet carrier 31 to cause rotation of an output shaft (not shown) connected thereto.

After a given period of use, the hardened spline teeth of the ring gear gradually wear down the relatively soft spline teeth 20 of the housing 18 and eventually cause backlash or failure such that either replacement of the housing or repair thereof is required. In accordance with the present invention the repair of the assemblage may be readily accomplished.

Figure 3:
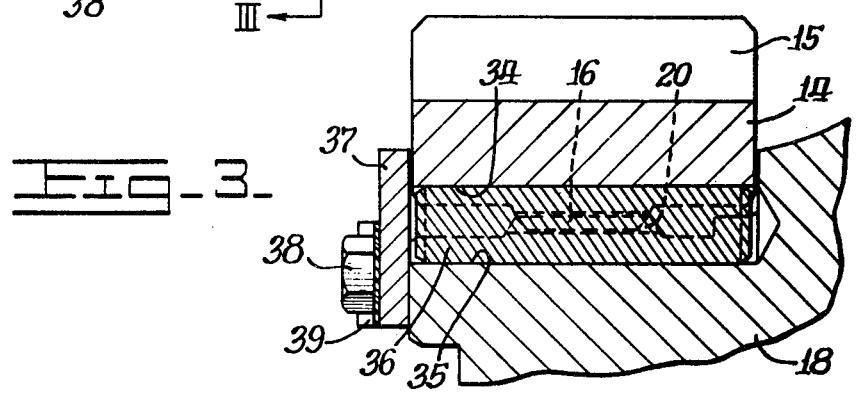
FIG. 3 is a sectional view taken along the line III—III in FIG. 2.

In the case of a conventional splined ring gear-housing assembly which is not equipped with the present drive pin and aperture means, the first repair step is to remove the ring gear 14 from the housing 18. Next, a plurality of semi-circular recesses 34 (see FIGS. 2 and 3) are ground into the outer peripheral splined surface of the ring gear. Subsequently, the ring gear is reinstalled within the housing. Next, complementary semi-circular recesses 35 are drilled into the housing 18 to form with the ring gear semi-circular recesses a plurality of circular apertures which span the peripheral interface between the ring gear and the housing. Hardened drive pins 36 are then placed within the circular apertures for driving, load supporting connection between the ring gear and the housing. Finally, in order to prevent axial movement of the pins or the ring gear, keeper plates 37 are installed in covering relation to the end portions of the pins. The keeper plates are secured to the housing by means of a pair of cap screws 38 and locking means 39, or the like.

FIGS. 4 and 5 of the drawings illustrate the present invention as it relates to an original article of manufacture. That is, instead of adapting the present invention to the repair of a splined ring gear-housing assembly, the present invention can be used as an original connection means in lieu of the previously utilized splined connections. As shown, a ring gear 40 is provided with a plurality of teeth 42 on the inner peripheral surface thereof and is provided with a substantially smooth external peripheral surface 44. Final drive casing or housing 46 is also provided with a smooth inner peripheral surface 48 which mates with the surface 44 and with a plurality of threaded holes 50. The hardened ring gear 40 is provided with a plurality of semi-circular recesses 52 which are machined therein and which are used as guides, after installation of the ring gear, for drilling complimentary semi-circular recesses 54 in the housing 46. A drive pin 56 is installed in each of the holes formed by the complementary recesses 52 and 54 to drivingly connect the ring gear to the housing 46 as described with reference to FIGS. 2 and 3. A keeper plate 58 is then secured to the housing 46 by means of a pair of bolts 60 to retain the pins 56 axially within the respective holes and to constrain axial movement of the ring gear relative to the housing.

Initial installation of the ring gear 40 within the housing 46 first involves the formation of the semi-circular recesses 52 within the outer peripheral surface of the ring gear 40. Next, the ring gear is installed within the inner surface 48 of the housing. The semi-circular recesses 54 in the housing are drilled using the recesses 52 as guides so as to provide circular apertures spanning the peripheral interface between the ring gear and the housing. The drive pins 56 are then installed within the circular apertures and the keeper plates 54 are affixed.

Even the improved ring gear-housing combination of the present invention is subject to wear after prolonged use. The drive pins 56, continually bearing against the recesses 54 can wallow out such recesses such that a repair or salvage operation is required. With concurrent reference to FIGS. 4 and 5, it is apparent that such repair of the assemblage could be readily accomplished by removing the pins 56 from between the ring gear and the housing, removing the ring gear from the housing, rotating the ring gear so that the semi-circular recesses 52 would be disposed in angularly spaced relation to the recesses 54 within the housing, drilling new semi-circular recesses 64 (shown in phantom), to complement the repositioned recesses in the ring gear so as to again form circular apertures, and reinstalling the drive pins and keeper plates 58, as previously described.

In view of the foregoing it should be apparent that the present invention provides a vastly improved and efficient ring gear-housing combination which is readily fabricated and repaired when necessary. The instant invention eliminates the need for expensive spline machining and the expensive tooling and time consumption related thereto.

While the invention has been described with particular reference to the preferred embodiments, it is apparent that variations and modifications are possible within the spirit of the inventive concept. No limitation with respect to such variations and modifications is intended, except by the purview of the appended claims.

I claim:
1. In a ring gear assembly having an annular ring gear housing and housing means for supporting said ring gear wherein the ring gear and housing means are provided with engaging spline means for preventing relative rotation of said ring gear with respect to said housing means, a method of repairing said ring gear assembly when said housing means spline means become worn and unable to prevent said relative rotation comprising the steps of;
   a. providing a first plurality of semicircular recesses in said ring gear at the interface thereof with said housing means,
   b. providing a second plurality of semicircular recesses in said housing means contiguous with said first plurality at the interface between said ring gear and said housing means,
   c. inserting a pin member in each of the apertures formed by said first and second contiguous pluralities of semicircular recesses,
   d. securing said pin member from axial movement.
2. The method of claim 1 wherein the step of securing the pin member further comprises: attaching plate means to said housing means in overlapping relationship to said interface and covering said pin member for limiting axial displacement of said pin member and ring gear with respect to said housing means.
3. In a ring gear assembly comprising a ring gear having peripherally disposed teeth means for engaging gear means of a drive mechanism, housing means for supporting said ring gear, said ring gear having a first peripheral surface contiguous with a corresponding second peripheral surface of said housing means, said first and second peripheral surfaces forming an annular interface between said ring gear and said housing means, said first peripheral surface having first recess means therein, said second peripheral surface having second recess means therein, corresponding to and aligned with said first recess means, said first and second recess means forming aperture means, connecting element means in said aperture means, keeper means mounted upon a portion of said housing means for limiting axial movement of said connecting element means and said ring gear in at least one direction; a method of repairing said assembly when said connecting element means cause said second recess means to wear such that said ring gear can rotate with respect to said housing means comprising the steps of;
   a. removing said keeper means from said assembly,
   b. removing said connecting element means from said aperture means,
   c. rotating said ring gear with respect to said housing means to angularly displace said first recess means with respect to said housing means,
   d. providing third recess means in said second peripheral surface angularly spaced apart from said second recess means and contiguous with said first recess means as angularly displaced, e. placing said connecting element means in the apertures formed by said first and third recess means, f. securing said connecting element means in the apertures formed by said first and third recess means.

4. The method of claim 3 wherein the step of securing the connecting element means further comprises;

attaching said keeper means to a portion of said housing means for engaging said connecting element means and limiting axial movement thereof.

5. The method of claim 2 wherein the step of providing a first plurality of semicircular recesses comprises the substeps of:

i. separating the ring gear from the housing means, ii. grinding a plurality of semicircular recesses in the outer peripheral spline surface of the ring gear;

and further wherein the step of providing a second plurality of semicircular recesses comprises the following substeps:

i. reinstalling said ring gear in said housing, ii. drilling said housing at points contiguous with said first plurality of semicircular recesses to form a plurality of circular apertures spanning the peripheral interface between said ring gear and said housing.

* * * * *